(12) United States Patent
Kawabe et al.

(10) Patent No.: US 11,707,966 B2
(45) Date of Patent: Jul. 25, 2023

(54) HEAT REQUEST ARBITRATION DEVICE, HEAT REQUEST ARBITRATION METHOD, NON-TRANSITORY STORAGE MEDIUM, AND VEHICLE

(71) Applicants: TOYOTA JIDOSHA KABUSHIKI KAISHA, Toyota (JP); DENSO CORPORATION, Kariya (JP)

(72) Inventors: Takayuki Kawabe, Toyota (JP); Tatsuya Masuhisa, Anjo (JP); Nobukazu Kuribayashi, Kariya (JP); Shinsaku Isomura, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 283 days.

(21) Appl. No.: 17/172,474

(22) Filed: Feb. 10, 2021

(65) Prior Publication Data

US 2021/0300144 A1  Sep. 30, 2021

(30) Foreign Application Priority Data

Mar. 31, 2020 (JP) .................... 2020-063567

(51) Int. Cl.
*B60H 1/00* (2006.01)
*B60L 58/26* (2019.01)

(52) U.S. Cl.
CPC ....... *B60H 1/0073* (2019.05); *B60H 1/00278* (2013.01); *B60L 58/26* (2019.02)

(58) Field of Classification Search
CPC .............. B60H 1/0073; B60H 1/00735; B60H 1/00885; B60H 1/32284; B60H 2001/00928; B60H 2001/00942; B60H 2001/00949; B60H 1/00278
See application file for complete search history.

(56) References Cited

U.S. PATENT DOCUMENTS

2017/0021698 A1* 1/2017 Hatakeyama ......... F25B 25/005
2019/0366800 A1* 12/2019 Durrani .............. B60H 1/00485
2020/0298661 A1   9/2020 Wada et al.

FOREIGN PATENT DOCUMENTS

JP  2015-186989 A  10/2015
JP  2020-152277 A   9/2020

* cited by examiner

*Primary Examiner* — Jenna M Hopkins
(74) *Attorney, Agent, or Firm* — Oliff PLC

(57) ABSTRACT

A device installed in a vehicle including a first thermal circuit, a second thermal circuit, and a third thermal circuit, is configured to arbitrate a heat request of the first thermal circuit, a heat request of the second thermal circuit, and a heat request of the third thermal circuit. The device is configured to acquire a heat absorption amount requested by the first thermal circuit, the second thermal circuit, and the third thermal circuit, and configured to set, as a target value of a transfer heat amount in which heat exchange is performed between the second thermal circuit and the third thermal circuit, a larger one of a heat dissipation amount requested by the second thermal circuit and a heat amount difference in which a heat dissipation amount requested by the third thermal circuit is subtracted from a heat absorption amount requested by the first thermal circuit.

7 Claims, 9 Drawing Sheets

HEAT REQUEST ARBITRATION DEVICE, HEAT REQUEST ARBITRATION METHOD, NON-TRANSITORY STORAGE MEDIUM, AND VEHICLE

CROSS-REFERENCE TO RELATED APPLICATION

This application claims priority to Japanese Patent Application No. 2020-063567 filed on Mar. 31, 2020, incorporated herein by reference in its entirety.

BACKGROUND

1. Technical Field

The present disclosure relates to a heat request arbitration device, a heat request arbitration method, a non-transitory storage medium, and a vehicle.

2. Description of Related Art

Japanese Unexamined Patent Application Publication No. 2015-186989 (JP 2015-186989 A) describes a vehicle air conditioner that includes a refrigeration circuit, a low water temperature circuit, and a high water temperature circuit that are thermal circuits. In the vehicle air conditioner, the refrigeration circuit and the high water temperature circuit can transfer heat via a heat exchanger, and the refrigeration circuit and the low water temperature circuit can transfer heat via a heat exchanger.

SUMMARY

In the vehicle air conditioner described in JP 2015-186989 A, there is a case in which a heat dissipation request (battery cooling request, etc.) by the low water temperature circuit and a heat absorption request (heating request using an outside air heat pump, etc.) by the high water temperature circuit occur at the same time.

In such a case, when the amount of heat transferred between each circuit is controlled by prioritizing heat dissipation (cooling of the battery) by the low water temperature circuit, the heat amount requested for heat absorption (heating) in the high water temperature circuit is insufficient. Thus, a situation may occur in which a heat dissipation unit (such as an electric heater) for heating the coolant of the high water temperature circuit is used to make up for this shortage. In such a situation, the power of the battery is consumed by the heat dissipation unit, and the power consumption (power consumption rate) is decreased. When the heat amount transferred between each circuit by prioritizing the heat absorption by the high water temperature circuit is controlled, there is a possibility that the heat dissipation in the low water temperature circuit (cooling of the battery) is insufficient, and a specific unit is affected (battery deterioration, etc.).

Therefore, there is room for further improvement in the mechanism for arbitrating a heat request from a plurality of thermal circuits.

The present disclosure provides a heat request arbitration device and the like capable of efficiently arbitrating heat requests from a plurality of thermal circuits.

The first aspect of the present disclosure is a heat request arbitration device that is installed in a vehicle including a first thermal circuit configured to circulate a first coolant, a second thermal circuit configured to circulate a second coolant having a temperature lower than a temperature of the first coolant, and a third thermal circuit configured to circulate a refrigerant while changing a state of the refrigerant and configured to exchange heat with each of the first thermal circuit and the second thermal circuit. The heat request arbitration device is configured to arbitrate a heat request of the first thermal circuit, a heat request of the second thermal circuit, and a heat request of the third thermal circuit. The heat request arbitration device includes an acquisition unit and a setting unit. The acquisition unit is configured to acquire a heat absorption amount or a heat dissipation amount requested by each of the first thermal circuit, the second thermal circuit, and the third thermal circuit. The setting unit is configured to set, as a target value of a transfer heat amount in which heat exchange is performed between the second thermal circuit and the third thermal circuit, a larger one of a heat dissipation amount requested by the second thermal circuit and a heat amount difference in which a heat dissipation amount requested by the third thermal circuit is subtracted from a heat absorption amount requested by the first thermal circuit.

In the first aspect, the heat dissipation amount requested by the second thermal circuit may include a heat amount that is dissipated to a refrigerant of the second thermal circuit by a battery for cooling.

In the first aspect, the heat absorption amount requested by the first thermal circuit may include a heat amount absorbed from the first coolant of the first thermal circuit by a unit configured to exchange heat for heating, or dehumidifying and heating.

In the first aspect, the heat absorption amount, the heat dissipation amount, and the transfer heat amount may be represented by an amount of heat energy transferred per unit time.

A second aspect of the present disclosure is a heat request arbitration method executed by a computer of a heat request arbitration device that is installed in a vehicle including a first thermal circuit configured to circulate a first coolant, a second thermal circuit configured to circulate a second coolant having a temperature lower than a temperature of the first coolant, and a third thermal circuit configured to circulate a refrigerant while changing a state of the refrigerant and configured to exchange heat with each of the first thermal circuit and the second thermal circuit. The heat request arbitration device is configured to arbitrate a heat request of the first thermal circuit, a heat request of the second thermal circuit, and a heat request of the third thermal circuit. The heat request arbitration method includes: a step of acquiring a heat absorption amount or a heat dissipation amount requested by each of the first thermal circuit, the second thermal circuit, and the third thermal circuit; and a step of setting, as a target value of a transfer heat amount in which heat exchange is performed between the second thermal circuit and the third thermal circuit, a larger one of a heat dissipation amount requested by the second thermal circuit and a heat amount difference in which a heat dissipation amount requested by the third thermal circuit is subtracted from a heat absorption amount requested by the first thermal circuit.

A third aspect of the present disclosure is a non-transitory storage medium storing instructions that are executable by one or more processors of a computer in a heat request arbitration device installed in a vehicle including a first thermal circuit configured to circulate a first coolant, a second thermal circuit configured to circulate a second coolant having a temperature lower than a temperature of the first coolant, and a third thermal circuit configured to circulate a refrigerant while changing a state of the refrigerant and configured to exchange heat with each of the first thermal circuit and the second thermal circuit. The heat request arbitration device is configured to arbitrate a heat request of the first thermal circuit, a heat request of the second thermal circuit, and a heat request of the third thermal circuit, and the instructions cause the one or more processors to perform steps. The steps are: a step of acquiring a heat absorption amount or a heat dissipation amount requested by each of the first thermal circuit, the second thermal circuit, and the third thermal circuit; and a step of setting, as a target value of a transfer heat amount in which heat exchange is performed between the second thermal circuit and the third thermal circuit, a larger one of a heat dissipation amount requested by the second thermal circuit and a heat amount difference in which a heat dissipation amount requested by the third thermal circuit is subtracted from a heat absorption amount requested by the first thermal circuit.

A fourth aspect of the present disclosure is a vehicle including a first thermal circuit configured to circulate a first coolant, a second thermal circuit configured to circulate a second coolant having a temperature lower than a temperature of the first coolant, and a third thermal circuit that is configured to circulate a refrigerant while changing a state of the refrigerant and that is configured to exchange heat with each of the first thermal circuit and the second thermal circuit. The vehicle includes a heat request arbitration device configured to arbitrate a heat request of the first thermal circuit, a heat request of the second thermal circuit, and a heat request of the third thermal circuit. The heat request arbitration device includes: an acquisition unit that is configured to acquire a heat absorption amount or a heat dissipation amount requested by each of the first thermal circuit, the second thermal circuit, and the third thermal circuit; and a setting unit that is configured to set, as a target value of a transfer heat amount in which heat exchange is performed between the second thermal circuit and the third thermal circuit, a larger one of a heat dissipation amount requested by the second thermal circuit and a heat amount difference in which a heat dissipation amount requested by the third thermal circuit is subtracted from a heat absorption amount requested by the first thermal circuit.

According to the first aspect, the second aspect, the third aspect, and the fourth aspect of the present disclosure, when the heat amount of the difference in which the heat dissipation amount requested by the third thermal circuit is subtracted from the heat absorption amount requested by the first thermal circuit is larger than the heat dissipation amount requested by the second thermal circuit, arbitration is performed so as to control the heat amount to be transferred between each thermal circuit by prioritizing the heat absorption request of the first thermal circuit. With this arbitration process, using the dissipation heat unit that consumes electric power to satisfy the heat request of the first thermal circuit is avoided, and the electric cost (electric power consumption rate) is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A heat request arbitration device of the present disclosure performs arbitration so as to control a heat amount transferred between each thermal circuit by prioritizing a heat absorption request of a high temperature cooling circuit when a heat amount difference, in which the a heat dissipation amount requested by a refrigerant circuit is subtracted from a heat absorption amount requested by a high temperature cooling circuit, is larger than the heat dissipation amount requested by the low temperature cooling circuit. With this arbitration process, using the dissipation heat unit that consumes electric power to satisfy the heat request of the high temperature cooling circuit is avoided, and the electric cost (electric power consumption rate) is improved.

Hereinafter, an embodiment of the present disclosure will be described in detail with reference to the drawings, taking as an example a case where the heat request arbitration device is mounted on a vehicle.

Embodiment

Overall Configuration

Figure 1:
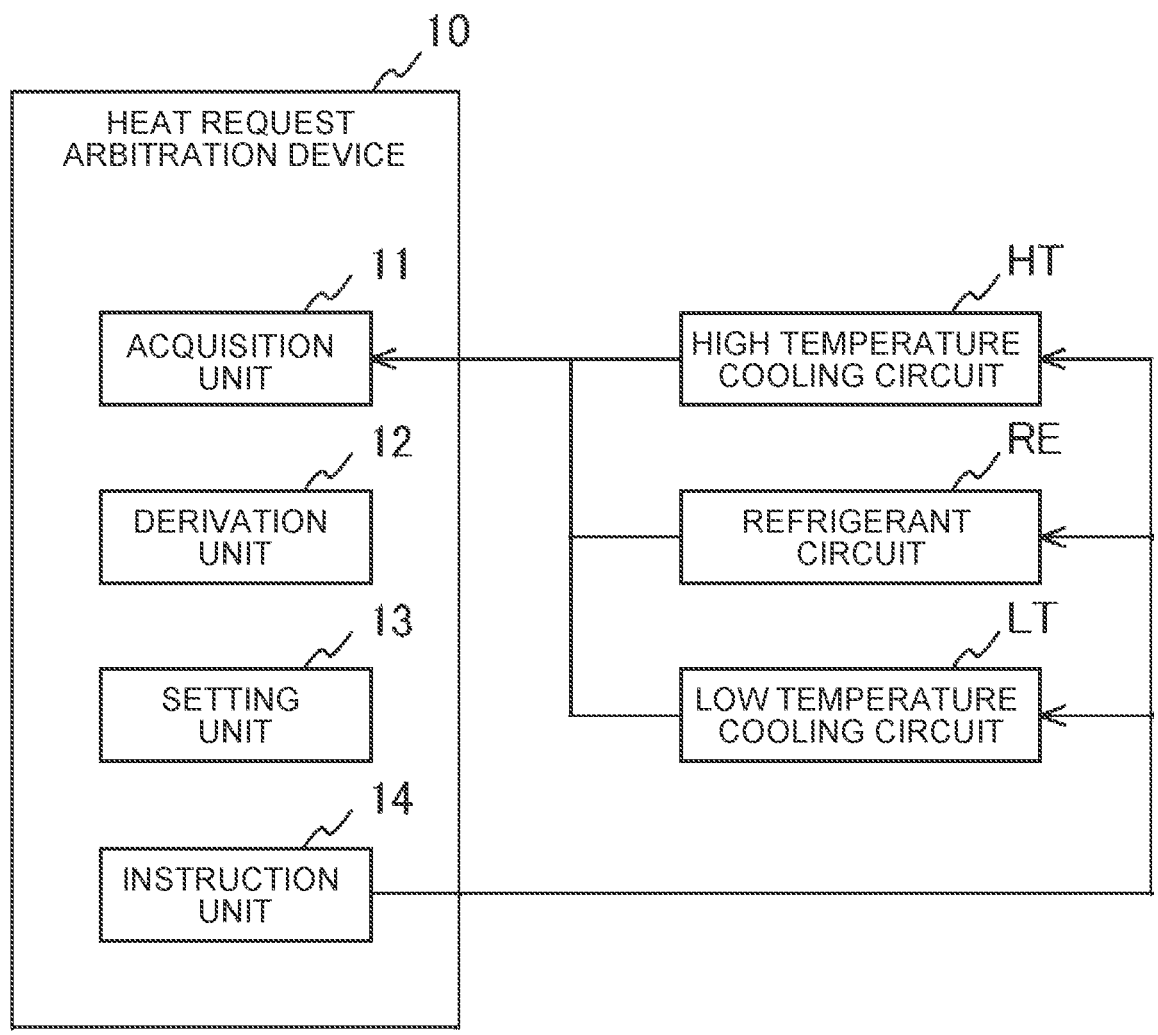
FIG. 1 is a functional block diagram showing a schematic configuration of a heat request arbitration device and thermal circuits according to an embodiment.

FIG. 1 is a functional block diagram showing a schematic configuration of a heat request arbitration device and thermal circuits according to the embodiment of the present disclosure.

A heat request arbitration device 10 is mounted on a vehicle having three thermal circuits of a high temperature cooling circuit HT, a low temperature cooling circuit LT, and a refrigerant circuit RE, and is a device that arbitrates requests related to heat (hereinafter referred to as "heat requests") from a plurality of units included in each thermal circuit. The heat request arbitration device 10 can communicate with a control device of a unit included in each thermal circuit via an in-vehicle network such as a Controller Area Network (CAN). The high temperature cooling circuit HT, the low temperature cooling circuit LT, and the refrigerant circuit RE each have a flow path for circulating a heat medium. The unit included in each thermal circuit can exchange heat with the heat medium. Further, the refrigerant circuit RE is coupled to each of the high temperature cooling circuit HT and the low temperature cooling circuit LT such that the refrigerant circuit RE can exchange heat with each of the high temperature cooling circuit HT and the low temperature cooling circuit LT. Here, the heat request from the unit is information including a value of a heat absorption amount indicating the amount of heat desired by the unit from another unit or a value of a heat dissipation amount indicating the amount of heat that the unit wants to give to another unit. The heat absorption amount or the heat dissipation amount can be expressed by the amount of heat energy transferred per unit time (power, unit: W).

The heat request arbitration device 10 includes an acquisition unit 11, a derivation unit 12, a setting unit 13, and an instruction unit 14. The acquisition unit 11 acquires a heat request by communication from a control device of a plurality of units included in the thermal circuits. The derivation unit 12 aggregates the heat requests of the plurality of units acquired by the acquisition unit 11 for each thermal circuit, and derives the aggregated heat amount as the heat absorption amount or the heat dissipation amount requested by each thermal circuit. The setting unit 13 sets at least the amount of heat allowed for each thermal circuit and the amount of heat to be transferred between the low temperature cooling circuit LT and the refrigerant circuit RE based on the heat absorption amount or the heat dissipation amount requested by each thermal circuit, which is derived by the derivation unit 12. The instruction unit 14 instructs each thermal circuit to operate based on the contents set by the setting unit 13.

Figure 2:
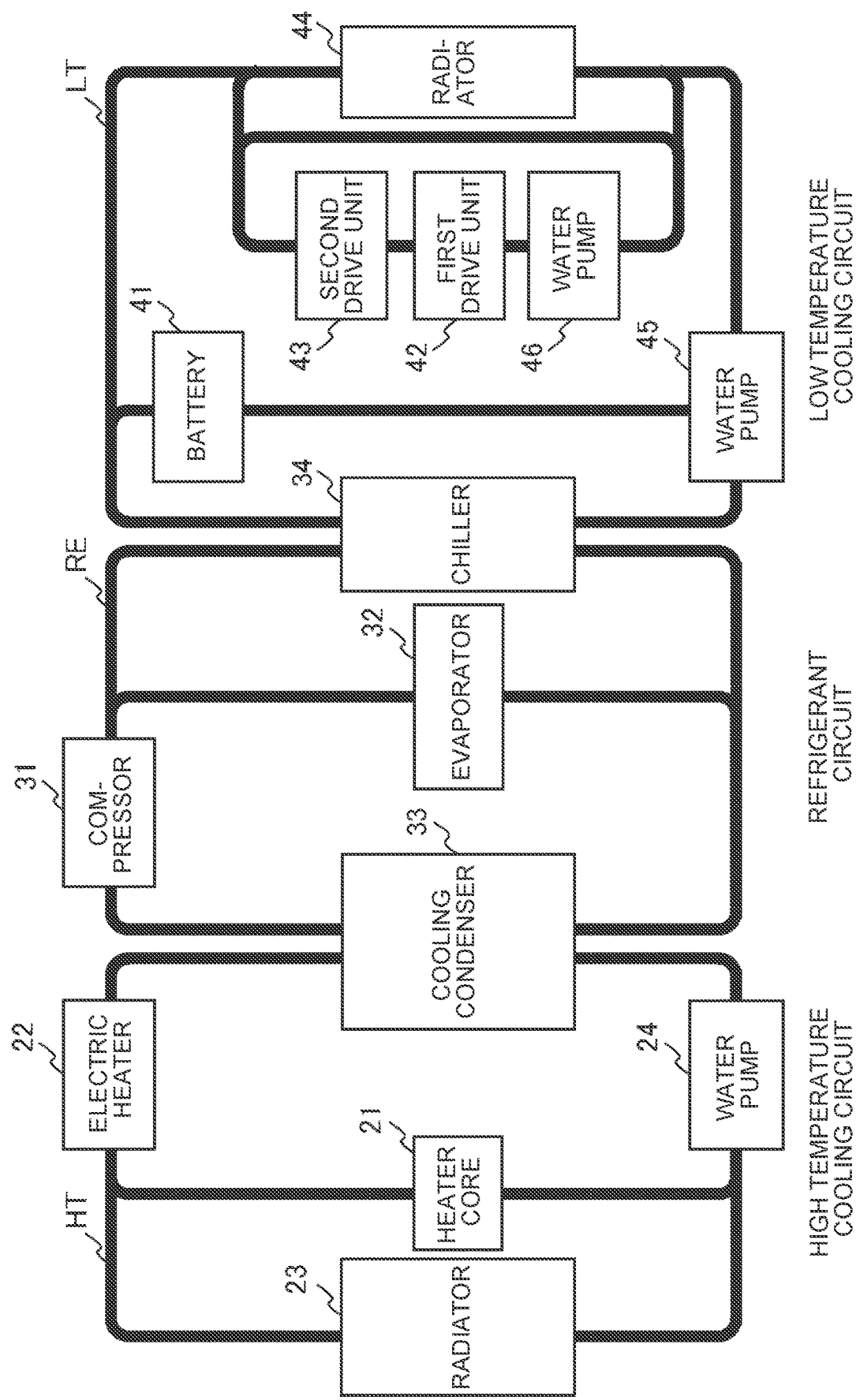
FIG. 2 is a block diagram showing a configuration example of each thermal circuit shown in FIG. 1.

FIG. 2 is a block diagram showing a configuration example of the high temperature cooling circuit HT, the low temperature cooling circuit LT, and the refrigerant circuit RE shown in FIG. 1. In FIG. 2, the flow path through which the heat medium circulates in each thermal circuit is indicated by a bold line.

The high temperature cooling circuit HT is a circuit that circulates a coolant (first coolant) as a heat medium, and is a first thermal circuit including a heater core 21, an electric heater 22, a radiator 23, and a water pump 24. The high temperature cooling circuit HT has a function of storing heat in the coolant for heating the vehicle cabin and a function of radiating heat received from the refrigerant circuit RE by heat exchange to the outside of the vehicle. The heater core 21 is a unit that has a tube through which the coolant flows and fins and that exchanges heat between the air passing through the fins and the coolant. The electric heater 22 is a unit that heats the coolant when the temperature of the coolant is not high enough. The radiator 23 is a unit for air-cooling the coolant. The radiator 23 has a radiator core, a grill shutter, and a radiator fan. The radiator core has a tube through which the coolant flows and fins, and exchanges heat between the air passing through the fins and the coolant. The grill shutter is disposed in front of the radiator core and increases or decreases the amount of ventilation to the radiator core. The radiator fan is disposed behind the radiator core and forcibly ventilates the radiator core. The water pump 24 is a unit that circulates the coolant.

In the high temperature cooling circuit HT, the heater core 21 and the radiator 23 are units capable of absorbing heat from the coolant. The electric heater 22 is a unit capable of dissipating heat to the coolant. The water pump 24 itself does not absorb nor dissipation heat, but is a unit that can change the heat radiation amount of the radiator 23 and the amount of heat transferred from the refrigerant circuit RE via a water cooling condenser 33 described later, based on the flow velocity of the coolant.

The high temperature cooling circuit HT is configured to be able to switch a flow path for circulating the coolant in a plurality of patterns. Examples of the switchable pattern include: a flow path for circulating the coolant to all of the heater core 21, the electric heater 22, the radiator 23, and the water cooling condenser 33 with the water pump 24; a flow path for circulating the coolant to the electric heater 22, the radiator 23, and the water cooling condenser 33 with the water pump 24; and a flow path for circulating the coolant in the heater core 21, the electric heater 22, and the water cooling condenser 33 with the water pump 24. Switching of each flow path is performed by controlling a switching valve (not shown).

The low temperature cooling circuit LT is a circuit that circulates a coolant (second coolant) as a heat medium, and is a second thermal circuit including a battery 41, a first drive unit 42, a second drive unit 43, a radiator 44, and water pumps 45 and 46. The battery 41 is a unit that stores electric power to be supplied to the traveling motor. The first drive unit 42 and the second drive unit 43 are units involved in the traveling of the vehicle, include an inverter for driving a traveling motor, a DCDC converter for voltage conversion, and the like, and can be a power control unit (PCU) that controls electric power supplied to the traveling motor, or a transaxle (TA) in which a traveling motor, a generator, a power split mechanism, and a transmission are integrated. The first drive unit 42 and the second drive unit 43 are examples, and the units involved in the traveling of the vehicle are not limited to those shown in the figure. The radiator 44 is a unit for cooling or heating the coolant with air. The radiator 44 has a radiator core, a grill shutter, and a radiator fan. The radiator core has a tube through which the coolant flows and fins, and exchanges heat between the air passing through the fins and the coolant. The grill shutter is disposed in front of the radiator core and increases or decreases the amount of ventilation to the radiator core. The radiator fan is disposed behind the radiator core and forcibly ventilates the radiator core. The water pumps 45 and 46 are units for circulating the coolant.

In the low temperature cooling circuit LT, the radiator 44 is a unit configured to exchange heat between the outside air and the coolant by absorbing heat from the coolant or dissipating heat to the coolant. The battery 41, the first drive unit 42, and the second drive unit 43 are units capable of dissipating heat to the coolant via a water jacket that constitutes a part of the flow path of the coolant. The water pumps 45 and 46 themselves do not absorb heat nor dissipation heat, but are units that can control the heat dissipation amount from the battery 41, the first drive unit 42, and the second drive unit 43 to the coolant, the heat radiation amount and the heat absorption amount of the radiator 44, and the amount of heat transferred to the refrigerant circuit RE via a chiller 34 described later, based on the flow velocity of the coolant. Since the low temperature cooling circuit LT is provided in principle to cool the battery 41, the first drive unit 42, and the second drive unit 43 to ensure reliability, the temperature of the coolant (second coolant) circulating in the low temperature cooling circuit LT is usually kept lower than the temperature of the coolant (first coolant) circulating in the high temperature cooling circuit HT.

The low temperature cooling circuit LT is configured to be able to switch the flow path for circulating the coolant in a plurality of patterns. Examples of the switchable pattern include: a flow path for circulating the coolant to the battery 41 and the chiller 34 with the water pump 45; a flow path for circulating the coolant to the radiator 44 and the chiller 34 with the water pump 45; a flow path for circulating the coolant to the first drive unit 42, the second drive unit 43, and the radiator 44 with the water pump 46; and a flow path for circulating the coolant to the first drive unit 42 and the second drive unit 43 with the water pump 46. Switching of each flow path is performed by controlling a switching valve (not shown).

The refrigerant circuit RE is a circuit that circulates the refrigerant that is a heat medium while changing its state, and is a third thermal circuit including a compressor 31, an evaporator 32, a water cooling condenser 33, and the chiller 34. In the refrigerant circuit RE, the refrigerant compressed by the compressor 31 is condensed by the water cooling condenser 33, and the condensed refrigerant is injected into the evaporator 32 from an expansion valve provided in the evaporator 32 to expand the refrigerant, such that heat can be absorbed from the air surrounding the evaporator 32. In the refrigerant circuit RE, the compressor 31 and the evaporator 32 are units capable of dissipating heat to the refrigerant. The water cooling condenser 33 is a unit capable of absorbing heat from the refrigerant and dissipating heat to the coolant of the high temperature cooling circuit HT. The chiller 34 is a unit capable of absorbing heat from the coolant of the low temperature cooling circuit LT and dissipating heat to the refrigerant.

The refrigerant circuit RE is coupled to the low temperature cooling circuit LT via the chiller 34 such that the refrigerant circuit RE can exchange heat with the low temperature cooling circuit LT, and heat generated in the low temperature cooling circuit LT can be transferred to the refrigerant circuit RE via the chiller 34. Further, the refrigerant circuit RE is coupled to the high temperature cooling circuit HT via the water cooling condenser 33 such that the refrigerant circuit RE can exchange heat with the high temperature cooling circuit HT, and can transfer heat generated in the refrigerant circuit RE and/or heat transferred from the low temperature cooling circuit LT to the refrigerant circuit RE to the high temperature cooling circuit HT via the water cooling condenser 33.

The refrigerant circuit RE is configured to be able to switch the flow path for circulating the coolant in a plurality of patterns. Examples of the switchable pattern include: a flow path for circulating the refrigerant to all of the evaporator 32, the water cooling condenser 33, and the chiller 34 with the compressor 31; a flow path for circulating the refrigerant to the water cooling condenser 33 and the chiller 34 with the compressor 31; and a flow path for circulating the refrigerant to the evaporator 32 and the water cooling condenser 33 with the compressor 31. Switching of each flow path is performed by controlling a switching valve (not shown).

Although the thermal circuits mounted on an electric vehicle (EV) have been described as an example in FIG. 2, the heat request arbitration device 10 according to the present embodiment can also be applied to a hybrid vehicle (HV). In the case of a hybrid vehicle, the high temperature cooling circuit HT can be used to cool the engine.

Control

Figure 3:
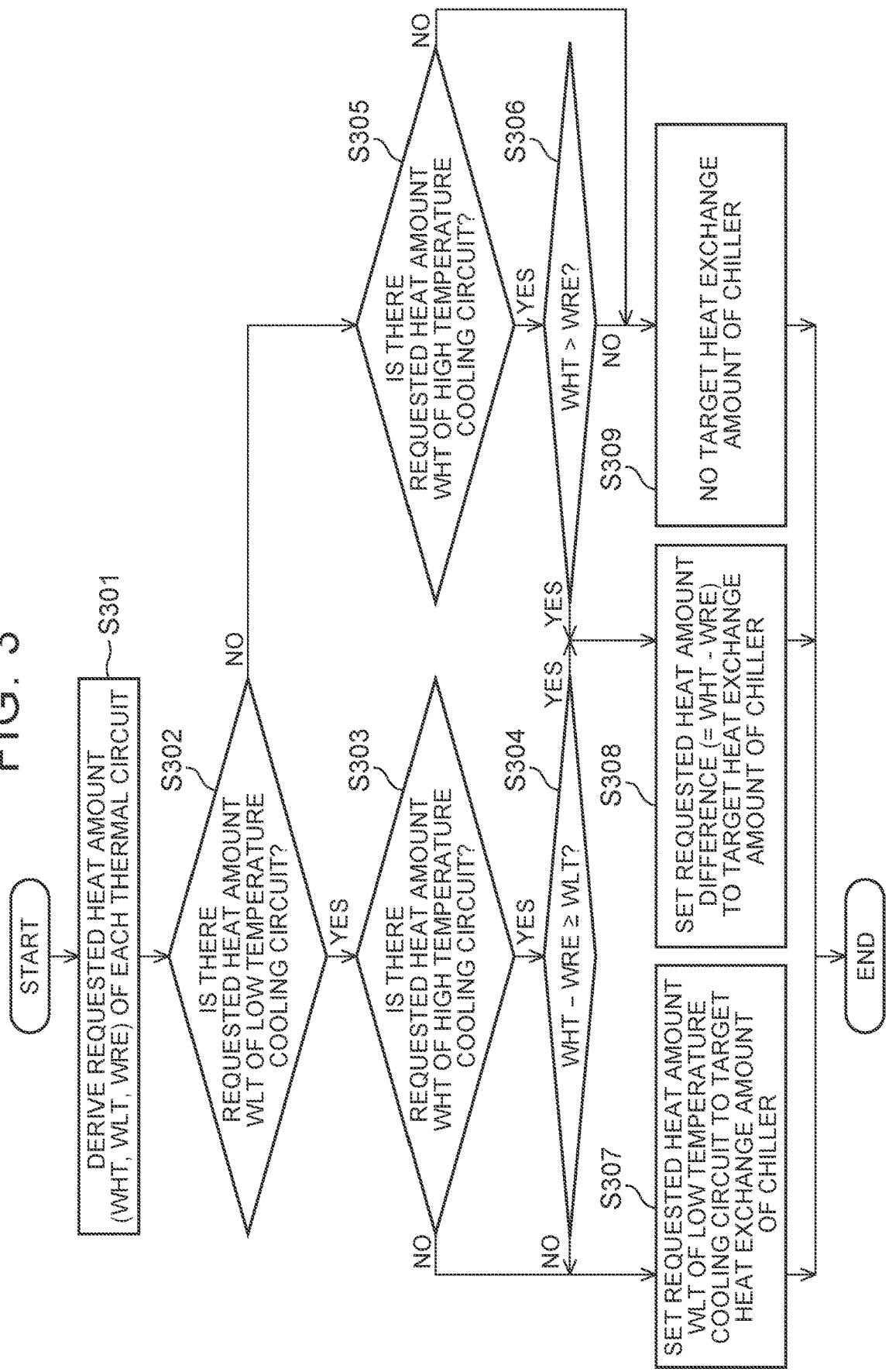
FIG. 3 is a processing flowchart of arbitration control executed by the heat request arbitration device.

The control performed by the heat request arbitration device 10 according to the present embodiment will be described with reference to FIG. 3. FIG. 3 is a processing flowchart of arbitration control executed by the heat request arbitration device 10.

Step S301

The derivation unit 12 of the heat request arbitration device 10 derives the amount of heat requested by each of the thermal circuits of the high temperature cooling circuit HT, the low temperature cooling circuit LT, and the refrigerant circuit RE based on the plurality of heat requests acquired by the acquisition unit 11. In this embodiment, the absolute value of the amount of heat requested by the high temperature cooling circuit HT for heat absorption is described as a "requested heat amount WHT", the absolute value of the amount of heat requested by the low temperature cooling circuit LT for heat dissipation is described as a "requested heat amount WLT", and the absolute value of the amount of heat requested by the refrigerant circuit RE for heat dissipation is described as a "requested heat amount WRE".

Step S302

The setting unit 13 of the heat request arbitration device 10 determines whether there is the requested heat amount WLT requested by the low temperature cooling circuit LT. It is possible to determine whether there is a request for cooling the battery 41 included in the low temperature cooling circuit LT depending on whether there is the requested heat amount WLT that requests heat dissipation. When there is the requested heat amount WLT of the low temperature cooling circuit LT (S302, YES), it is determined that a cooling request for the battery 41 has occurred, and the process proceeds to step S303. In contrast, when there is no requested heat amount WLT of the low temperature cooling circuit LT (S302, NO), it is determined that a cooling request of the battery 41 has not occurred, and the process proceeds to step S305. The case in which there is no requested heat amount WLT of the low temperature cooling circuit LT includes the case in which the low temperature cooling circuit LT requests heat absorption (such as raising the temperature of the battery 41) as the heat amount.

Step S303

The setting unit 13 of the heat request arbitration device 10 determines whether there is the requested heat amount WHT requested by the high temperature cooling circuit HT. Depending on whether there is the requested heat amount WHT that requires heat absorption, it can be determined whether a request for heating or dehumidifying and heating is generated as an air conditioning instruction for the vehicle, for example. When there is the requested heat amount WHT of the high temperature cooling circuit HT (S303, YES), the process proceeds to step S304. In contrast, when there is no requested heat amount WHT of the high temperature cooling circuit HT (S303, NO), the process proceeds to step S307. In addition, the case in which there is no requested heat amount WHT of the high temperature cooling circuit HT includes the case in which the high temperature cooling circuit HT requests heat dissipation (heat dissipation from the radiator 23, etc.) as the heat amount.

Here, the case in which the determination in step S303 is "YES" is when there is the requested heat amount WLT of the low temperature cooling circuit LT and there is the requested heat amount WHT of the high temperature cooling circuit HT. As an example, there is a case in which the battery 41 has a high temperature and heating by the air conditioner is desired. An example of the flow path pattern of each thermal circuit in this case is shown in FIG. 4.

Figure 4:
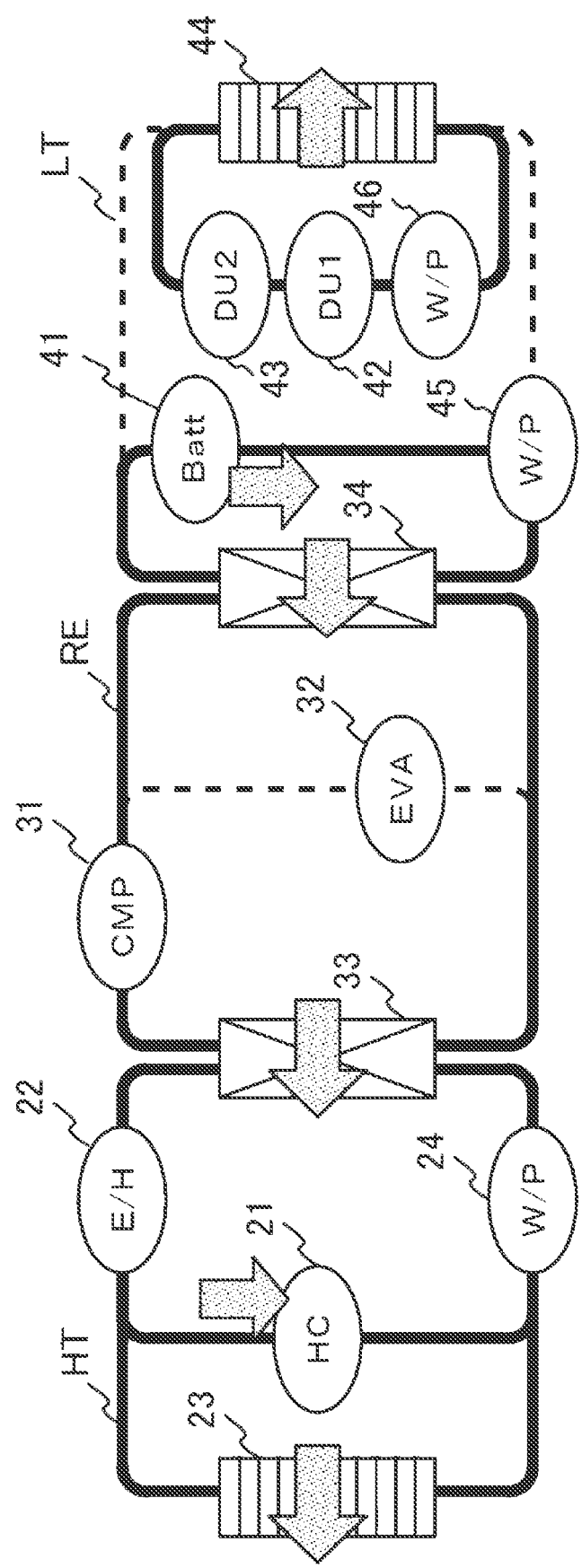
FIG. 4 is a diagram illustrating an example of a flow path pattern of each thermal circuit.

In the example of FIG. 4, in the low temperature cooling circuit LT, the following are each formed: a flow path for circulating the coolant in the battery (Batt) 41 and the chiller 34 with the water pump (W/P) 45; and a flow path for circulating the coolant in the first drive unit (DU1) 42, the second drive unit (DU2) 43, and the radiator 44 with the water pump (W/P) 46. In the refrigerant circuit RE, the compressor (CMP) 31 forms a flow path for circulating the coolant in the water cooling condenser 33 and the chiller 34. In the high temperature cooling circuit HT, a flow path for circulating the coolant in all of the heater core (HC) 21, the electric heater (E/H) 22, the radiator 23, and the water cooling condenser 33 with the water pump (W/P) 24 is formed. With the flow path in FIG. 4, the battery 41 can be cooled and heating using the dissipation heat of the battery 41 can be performed at the same time.

Further, the case in which the determination in step S303 is "NO" is a case in which there is the requested heat amount WLT of the low temperature cooling circuit LT and there is no requested heat amount WHT of the high temperature cooling circuit HT. As an example, there is a case in which the battery 41 has a high temperature and cooling by the air conditioner is desired. An example of the flow path pattern of each thermal circuit in this case is shown in FIG. 5.

Figure 5:
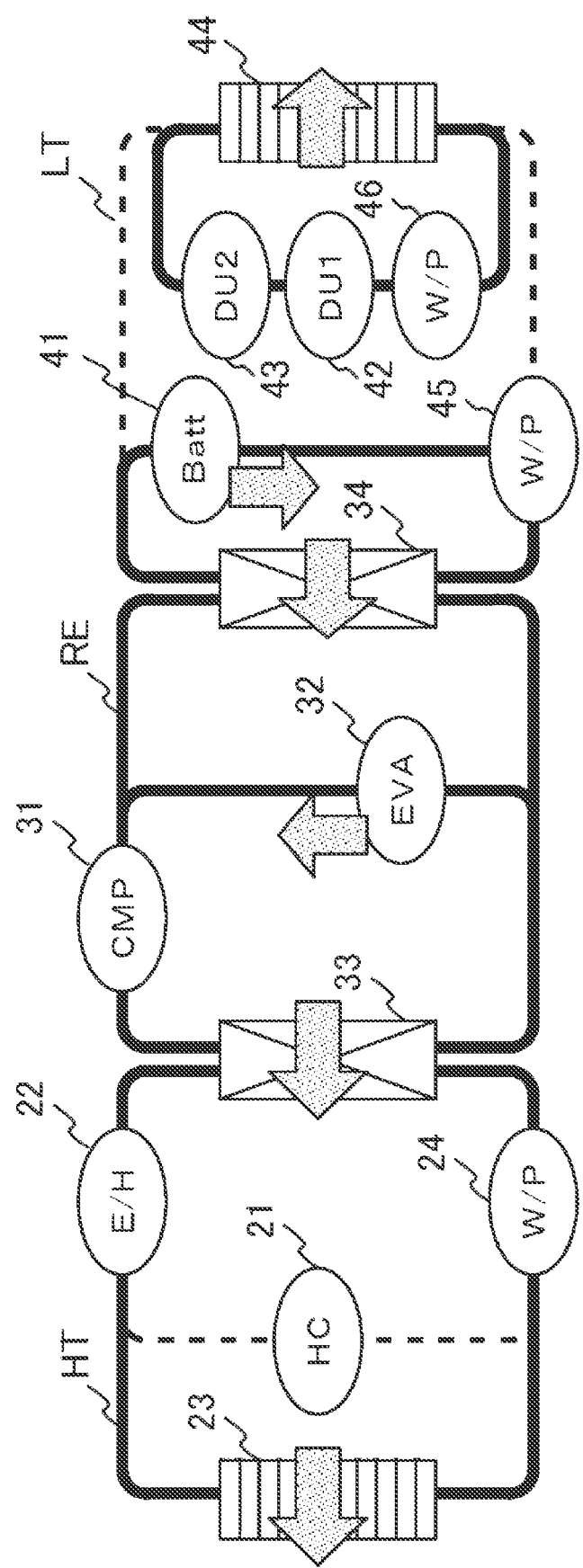
FIG. 5 is a diagram illustrating an example of the flow path pattern of each thermal circuit.

In the example of FIG. 5, in the low temperature cooling circuit LT, the following are each formed: a flow path for circulating the coolant in the battery (Batt) 41 and the chiller 34 with the water pump (W/P) 45; and a flow path for circulating the coolant in the first drive unit (DU1) 42, the second drive unit (DU2) 43, and the radiator 44 with the water pump (W/P) 46. In the refrigerant circuit RE, a flow path for circulating the coolant in all of the evaporator (EVA) 32, the water cooling condenser 33, and the chiller 34 with the compressor (CMP) 31 is formed. In the high temperature cooling circuit HT, a flow path for circulating the coolant in the electric heater (E/H) 22, the radiator 23, and the water cooling condenser 33 with the water pump (W/P) 24 is formed. With the flow path in FIG. 5, the battery 41 to be cooled and cooling can be performed at the same time.

Step S304

In the setting unit 13 of the heat request arbitration device 10, it is determined whether the requested heat amount difference (WHT−WRE), which is the heat amount obtained by subtracting the requested heat amount WRE of the refrigerant circuit RE from the requested heat amount WHT of the high temperature cooling circuit HT, is equal to or more than the requested heat amount WLT of the low temperature cooling circuit LT. Thereby, it can be determined whether the heat absorption amount requested in the high temperature cooling circuit HT can be covered by the total heat dissipation amount of the refrigerant circuit RE and the low temperature cooling circuit LT. When the requested heat amount difference (WHT−WRE) is equal to or greater than the requested heat amount WLT (S304, YES), it is determined that the endothermic requirement of the high temperature cooling circuit HT cannot be satisfied by the heat dissipation request of the refrigerant circuit RE and the low temperature cooling circuit LT. The process proceeds to step S308. In contrast, when the requested heat amount difference (WHT−WRE) is less than the requested heat amount WLT (S304, no), it is determined that the endothermic requirement of the high temperature cooling circuit HT can be satisfied by the heat dissipation request of the refrigerant circuit RE and the low temperature cooling circuit LT. Then, the process proceeds to step S307.

Step S305

The setting unit 13 of the heat request arbitration device 10 determines whether there is the requested heat amount WHT requested by the high temperature cooling circuit HT. Depending on whether there is the requested heat amount WHT that requires heat absorption, it can be determined whether a request for heating or dehumidifying and heating is generated as an air conditioning instruction for the vehicle, for example. When there is a requested heat amount WHT of the high temperature cooling circuit HT (S305, YES), the process proceeds to step S306. In contrast, when the requested heat amount WHT of the high temperature cooling circuit HT does not exist (S305, no), the process proceeds to step S309. In addition, the case in which there is no requested heat amount WHT of the high temperature cooling circuit HT includes the case in which the high temperature cooling circuit HT requests heat dissipation (heat dissipation from the radiator 23, etc.) as the heat amount.

Here, the case in which the determination in step S305 is "YES" is when there is no requested heat amount WLT of the low temperature cooling circuit LT and there is the requested heat amount WHT of the high temperature cooling circuit HT. As an example, there is a case in which the battery 41 has a low temperature and heating by the air conditioner is desired.

Further, the case in which the determination in step S305 is "NO" is a case in which there is no requested heat amount WLT of the low temperature cooling circuit LT and there is the requested heat amount WHT of the high temperature cooling circuit HT. As an example, there is a case in which the battery 41 has a low temperature and cooling by the air conditioner is desired. An example of the flow path pattern of each thermal circuit in this case is shown in FIG. 7. In the example of FIG. 7, in the low temperature cooling circuit LT, a flow path for circulating the coolant in the first drive unit (DU1) 42, the second drive unit (DU2) 43, and the radiator 44 with the water pump (W/P) 46 is formed. In the refrigerant circuit RE, a flow path for circulating the refrigerant in the evaporator (EVA) 32 and the water cooling condenser 33 with the compressor (CMP) 31 is formed. In the high temperature cooling circuit HT, a flow path for circulating the coolant in the electric heater (E/H) 22, the radiator 23, and the water cooling condenser 33 with the water pump (W/P) 24 is formed. Cooling can be performed by the flow path of FIG. 6.

Step S306

The setting unit 13 of the heat request arbitration device 10 determines whether the requested heat amount WHT of the high temperature cooling circuit HT exceeds the requested heat amount WRE of the refrigerant circuit RE. Thereby, it can be determined whether the heat absorption amount requested in the high temperature cooling circuit HT can be covered only by the heat dissipation amount of the refrigerant circuit RE. When the requested heat amount WHT exceeds the requested heat amount WRE (S306, YES), it is determined that the heat absorption request of the high temperature cooling circuit HT cannot be satisfied only by the heat dissipation request of the refrigerant circuit RE, and the process proceeds to step S308. In contrast, when the requested heat amount WHT is less than the requested heat amount WRE (S306, NO), it is determined that the heat absorption request of the high temperature cooling circuit HT can be satisfied only by the heat dissipation request of the refrigerant circuit RE, and the process proceeds to step S309.

Here, in the case in which the determination in step S306 is "YES", there is a case in which there is no requested heat amount WLT of the low temperature cooling circuit LT, there is the requested heat amount WHT of the high temperature cooling circuit HT, and the requested heat amount WHT exceeds the requested heat amount WRE. As an example, there is a case in which the battery 41 has a low temperature and heating by the air conditioner is desired. An example of the flow path pattern of each thermal circuit in this case is shown in FIGS. 6 and 8.

Figure 6:
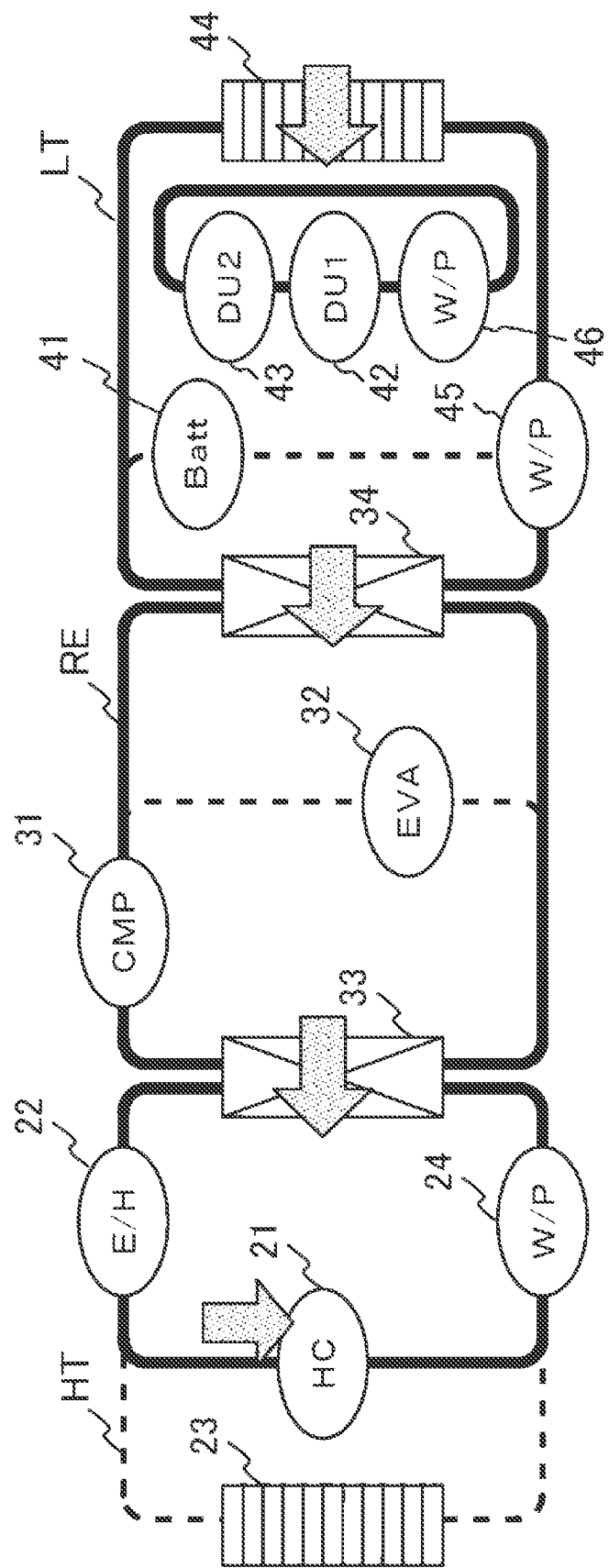
FIG. 6 is a diagram illustrating an example of the flow path pattern of each thermal circuit.
Figure 7:
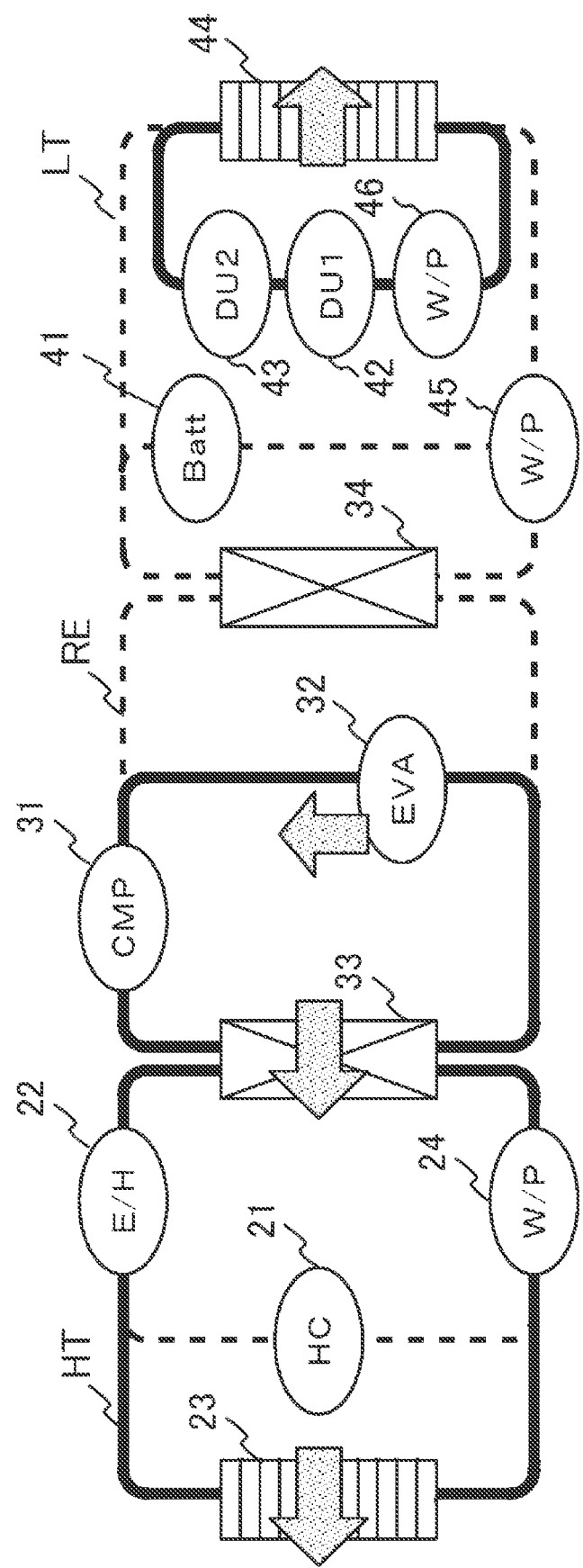
FIG. 7 is a diagram illustrating an example of the flow path pattern of each thermal circuit.

In the example of FIG. 6, in the low temperature cooling circuit LT, the following are each formed: a flow path for circulating the coolant in the radiator 44 and the chiller 34 with the water pump (W/P) 45; and a flow path for circulating the coolant in the first drive unit (DU1) 42 and the second drive unit (DU2) 43 with the water pump (W/P) 46. In the refrigerant circuit RE, the compressor (CMP) 31 forms a flow path for circulating the coolant in the water cooling condenser 33 and the chiller 34. In the high temperature cooling circuit HT, a flow path for circulating the coolant in the heater core (HC) 21, the electric heater (E/H) 22, and the water cooling condenser 33 with the water pump (W/P) 24 is formed. Heat pump heating using the outside air temperature can be performed by the flow path of FIG. 6.

Figure 8:
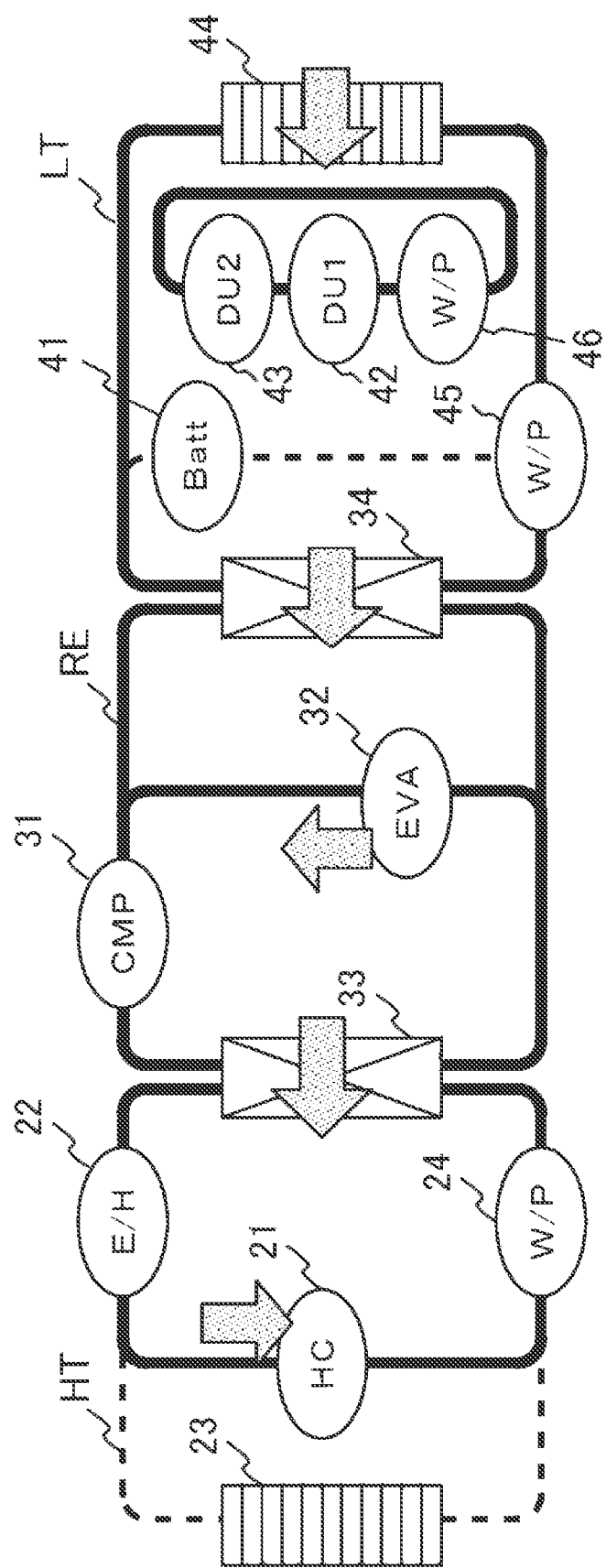
FIG. 8 is a diagram illustrating an example of the flow path pattern of each thermal circuit.

In the example of FIG. 8, in addition to the flow path pattern of FIG. 6, a flow path for circulating the coolant in the evaporator (EVA) 32 is also formed in the refrigerant circuit RE. With the flow path of FIG. 8, heat pump heating using the outside air temperature and heating using the dissipation heat from the evaporator 32 can be performed at the same time.

In the case in which the determination in step S306 is "NO", there is a case in which there is no requested heat amount WLT of the low temperature cooling circuit LT, there is the requested heat amount WHT of the high temperature cooling circuit HT, and the requested heat amount WHT is less than the requested heat amount WRE. As an example, there is a case in which the battery 41 has a low temperature and dehumidifying and heating by the air conditioner is desired. An example of the flow path pattern of each thermal circuit in this case is shown in FIG. 9.

Figure 9:
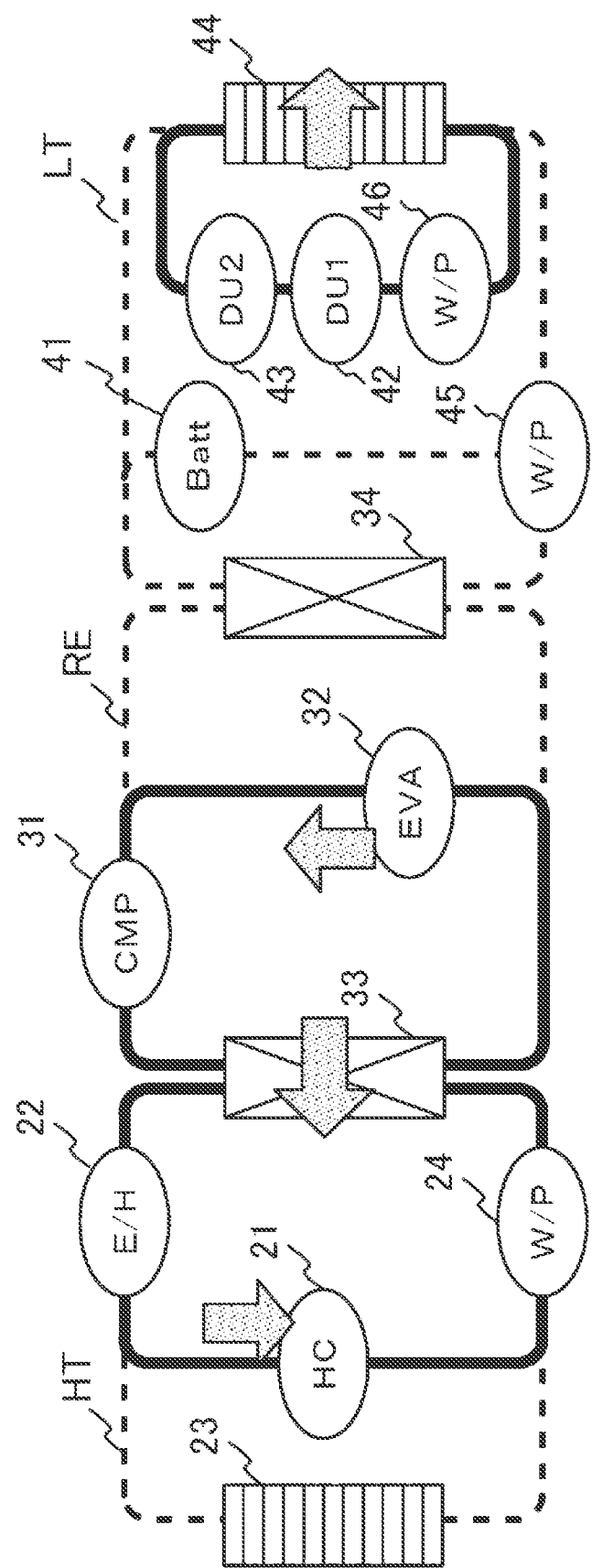
FIG. 9 is a diagram illustrating an example of the flow path pattern of each thermal circuit.

In the example of FIG. 9, in the low temperature cooling circuit LT, a flow path for circulating the coolant in the first drive unit (DU1) 42, the second drive unit (DU2) 43, and the radiator 44 with the water pump (W/P) 46 is formed. In the refrigerant circuit RE, a flow path for circulating the refrigerant in the evaporator (EVA) 32 and the water cooling condenser 33 with the compressor (CMP) 31 is formed. In the high temperature cooling circuit HT, a flow path for circulating the coolant in the heater core (HC) 21, the electric heater (E/H) 22, and the water cooling condenser 33 with the water pump (W/P) 24 is formed. The flow path pattern of FIG. 9 is useful when the requested heat amount WHT of the high temperature cooling circuit HT can be covered by only the heat dissipation amount of the compressor 31 and the evaporator 32. With the flow path of FIG. 9, dehumidification and heating can be performed using the heat dissipation amount of the compressor 31 and the evaporator 32.

Step S307

The setting unit 13 of the heat request arbitration device 10 sets the requested heat amount WLT of the low temperature cooling circuit LT as a target heat exchange amount that is a target value of the heat amount exchanged by the chiller 34. As a result, the requested heat amount WLT of the low temperature cooling circuit LT can be transferred to the refrigerant circuit RE via the chiller 34. Then, by transferring the transferred requested heat amount WLT and the requested heat amount WRE of the refrigerant circuit RE to the high temperature cooling circuit HT via the water cooling condenser 33, the requested heat amount WHT of the high temperature cooling circuit HT can be supplemented. Thus, it is not necessary to operate the electric heater 22 of the high temperature cooling circuit HT in order to secure the heat amount. When the target heat exchange amount is set, the arbitration process ends.

Step S308

The setting unit 13 of the heat request arbitration device 10 sets a requested heat amount difference (WHT−WRE) obtained from the high temperature cooling circuit HT and the refrigerant circuit RE as the target heat exchange amount that is a target value of the heat amount exchanged by the chiller 34. Thereby, the amount of the requested heat amount WHT of the high temperature cooling circuit HT that is insufficient in the requested heat amount WRE of the refrigerant circuit RE can be obtained from the low temperature cooling circuit LT. Thus, by transferring the requested heat amount WLT transferred from the low temperature cooling circuit LT and the requested heat amount WRE of the refrigerant circuit RE to the high temperature cooling circuit HT via the water cooling condenser 33, the requested heat amount WHT of the high temperature cooling circuit HT can be supplemented. Thus, it is not necessary to operate the electric heater 22 of the high temperature cooling circuit HT in order to secure the heat amount. When the target heat exchange amount is set, the arbitration process ends.

As can be understood from steps S307 and S308, in the arbitration process of the present embodiment, the larger one of the requested heat amount difference (WHT−WRE) and the requested heat amount WLT is set as the target heat exchange amount. With this arbitration process, both the requested heat amount WHT (heating or dehumidifying and heating) of the high temperature cooling circuit HT and the requested heat amount WLT (cooling of the battery 41) of the low temperature cooling circuit LT can be satisfied.

Here, when the requested heat amount WLT is set as the target heat exchange amount (step S307), there is a concern that the heat amount used for heating is excessively collected. However, since the excess heat can be dissipated from the radiator 23 of the high temperature cooling circuit HT, the amount of heat requested for heating can be appropriately controlled. Further, when the requested heat amount difference (WHT−WRE) is set as the target heat exchange amount (step S308), there is a concern that the battery 41 may be overcooled. However, since the requested heat amount WLT of the low temperature cooling circuit LT is lost and the flow path of each thermal circuit is switched from FIG. 4 to FIG. 6 when the temperature of the battery 41 reaches a predetermined target temperature, the battery 41 will not be cooled more than necessary.

Step S309

Since there is no heat amount request from the high temperature cooling circuit HT or the low temperature cooling circuit LT, the setting unit 13 of the heat request arbitration device 10 does not set the target heat exchange amount that is the target value of the heat amount at which heat exchange is performed by the chiller 34. When the target heat exchange amount is set, the arbitration process ends.

Operations and Effects

As described above, when the heat request is generated in each of the low temperature cooling circuit LT, the refrigerant circuit RE, and the high temperature cooling circuit HT, the heat request arbitration device 10 according to the embodiment of the present disclosure compares the requested heat amount difference (WHT−WRE), in which the requested heat amount of the refrigerant circuit RE is subtracted from the requested heat amount WRE of the high temperature cooling circuit HT, and the requested heat amount WLT of the low temperature cooling circuit LT. Then, the heat request arbitration device 10 sets the larger one of the requested heat amount difference (WHT−WRE) and the requested heat amount WLT, as the target value of the heat exchange amount of the chiller 34 that performs heat exchange between the low temperature cooling circuit LT and the refrigerant circuit RE.

With this control, when the requested heat amount difference (WHT−WRE) is larger than the requested heat amount WLT, the arbitration is performed such that the heat amount transferred between each thermal circuit by prioritizing the heat absorption request of the high temperature cooling circuit HT is controlled. Thus, it is possible to achieve both cooling and heating of the battery 41 by utilizing the limited heat that can be obtained without operating the electric heater 22 of the high temperature cooling circuit HT. Therefore, since the frequency of use of the electric heater 22 of the high temperature cooling circuit HT can be reduced, the electric cost (electric power consumption rate) is improved, and the cruising range of the vehicle can be extended.

Further, with this control, when the requested heat amount WLT is larger than the requested heat amount difference (WHT−WRE), arbitration is performed such that the heat amount transferred between each thermal circuit by prioritizing the heat dissipation of the low temperature cooling circuit LT is controlled. Thus, the requested heat amount WHT can be satisfied by utilizing the requested heat amount WLT while sufficiently cooling the battery 41. Therefore, the unit that becomes the heat source in the vehicle can be used efficiently.

Although the embodiment of the present disclosure has been described above, the present disclosure can be applied to a heat request arbitration device, a heat request arbitration method executed by a heat request arbitration device including a processor and a memory, a control program for executing a heat request arbitration method, a computer-readable non-transitory storage medium that stores a control program, and a vehicle equipped with a heat request arbitration device.

The heat request arbitration device of the present disclosure can be used to control arbitration of a heat amount in a plurality of thermal circuits provided in a vehicle.

What is claimed is:

1. A heat request arbitration device that is installed in a vehicle including a first thermal circuit configured to circulate a first coolant, a second thermal circuit configured to circulate a second coolant having a temperature lower than a temperature of the first coolant, and a third thermal circuit configured to circulate a refrigerant while changing a state of the refrigerant and configured to exchange heat with each of the first thermal circuit and the second thermal circuit, the heat request arbitration device being configured to arbitrate a heat request of the first thermal circuit, a heat request of the second thermal circuit, and a heat request of the third thermal circuit, the heat request arbitration device comprising:
a processor that is configured to:
acquire a heat absorption amount or a heat dissipation amount requested by each of the first thermal circuit, the second thermal circuit, and the third thermal circuit; and
set, as a target value of a transfer heat amount in which heat exchange is performed between the second thermal circuit and the third thermal circuit, a larger one of a heat dissipation amount requested by the second thermal circuit and a heat amount difference in which a heat dissipation amount requested by the third thermal circuit is subtracted from a heat absorption amount requested by the first thermal circuit.

2. The heat request arbitration device according to claim 1, wherein the heat dissipation amount requested by the second thermal circuit includes a heat amount that is dissipated to a refrigerant of the second thermal circuit by a battery for cooling.

3. The heat request arbitration device according to claim 1, wherein the heat absorption amount requested by the first thermal circuit includes a heat amount absorbed from the first coolant of the first thermal circuit by a unit configured to exchange heat for heating, or dehumidifying and heating.

4. The heat request arbitration device according to claim 1, wherein all heat absorptions amounts, heat dissipation amounts and transfer heat amounts are defined by an amount of heat energy transferred per unit time.

5. A heat request arbitration method executed by a computer of a heat request arbitration device that is installed in a vehicle including a first thermal circuit configured to circulate a first coolant, a second thermal circuit configured to circulate a second coolant having a temperature lower than a temperature of the first coolant, and a third thermal circuit configured to circulate a refrigerant while changing a state of the refrigerant and configured to exchange heat with each of the first thermal circuit and the second thermal circuit, the heat request arbitration device being configured to arbitrate a heat request of the first thermal circuit, a heat request of the second thermal circuit, and a heat request of the third thermal circuit, the heat request arbitration method comprising:
a step of acquiring a heat absorption amount or a heat dissipation amount requested by each of the first thermal circuit, the second thermal circuit, and the third thermal circuit; and
a step of setting, as a target value of a transfer heat amount in which heat exchange is performed between the second thermal circuit and the third thermal circuit, a larger one of a heat dissipation amount requested by the second thermal circuit and a heat amount difference in which a heat dissipation amount requested by the third thermal circuit is subtracted from a heat absorption amount requested by the first thermal circuit.

6. A non-transitory storage medium storing instructions that are executable by one or more processors of a computer in a heat request arbitration device installed in a vehicle including a first thermal circuit configured to circulate a first coolant, a second thermal circuit configured to circulate a second coolant having a temperature lower than a temperature of the first coolant, and a third thermal circuit configured to circulate a refrigerant while changing a state of the refrigerant and configured to exchange heat with each of the first thermal circuit and the second thermal circuit, the heat request arbitration device being configured to arbitrate a heat request of the first thermal circuit, a heat request of the second thermal circuit, and a heat request of the third thermal circuit, the instructions causing the one or more processors to perform steps comprising:
a step of acquiring a heat absorption amount or a heat dissipation amount requested by each of the first thermal circuit, the second thermal circuit, and the third thermal circuit; and
a step of setting, as a target value of a transfer heat amount in which heat exchange is performed between the second thermal circuit and the third thermal circuit, a larger one of a heat dissipation amount requested by the second thermal circuit and a heat amount difference in which a heat dissipation amount requested by the third thermal circuit is subtracted from a heat absorption amount requested by the first thermal circuit.

7. A vehicle including a first thermal circuit configured to circulate a first coolant, a second thermal circuit configured to circulate a second coolant having a temperature lower than a temperature of the first coolant, and a third thermal circuit that is configured to circulate a refrigerant while changing a state of the refrigerant and that is configured to exchange heat with each of the first thermal circuit and the second thermal circuit, the vehicle comprising
a processor that is configured to:
arbitrate a heat request of the first thermal circuit, a heat request of the second thermal circuit, and a heat request of the third thermal circuit, the heat request arbitration device including:
acquire a heat absorption amount or a heat dissipation amount requested by each of the first thermal circuit, the second thermal circuit, and the third thermal circuit; and
set, as a target value of a transfer heat amount in which heat exchange is performed between the second thermal circuit and the third thermal circuit, a larger one of a heat dissipation amount requested by the second thermal circuit and a heat amount difference in which a heat dissipation amount requested by the third thermal circuit is subtracted from a heat absorption amount requested by the first thermal circuit.

\* \* \* \* \*